S. R. McKAY.
RIM CLAMPING DEVICE.
APPLICATION FILED JULY 28, 1916.
1,228,796.
Patented June 5, 1917.
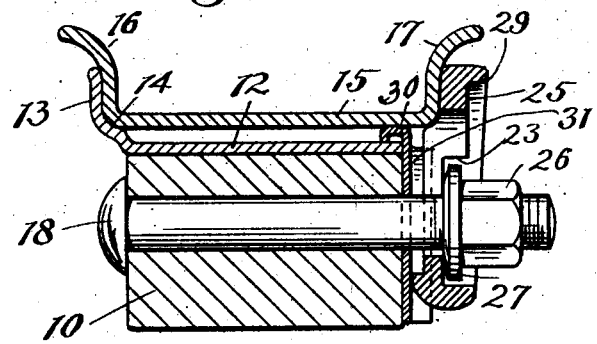
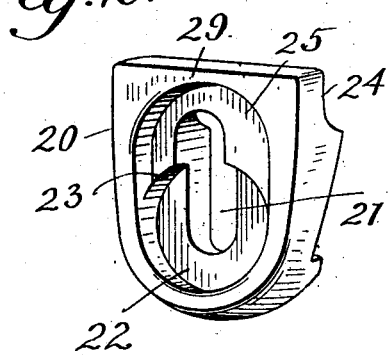
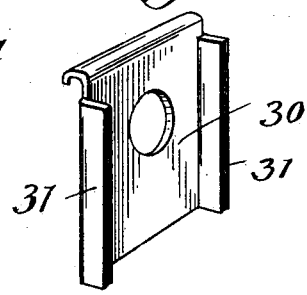
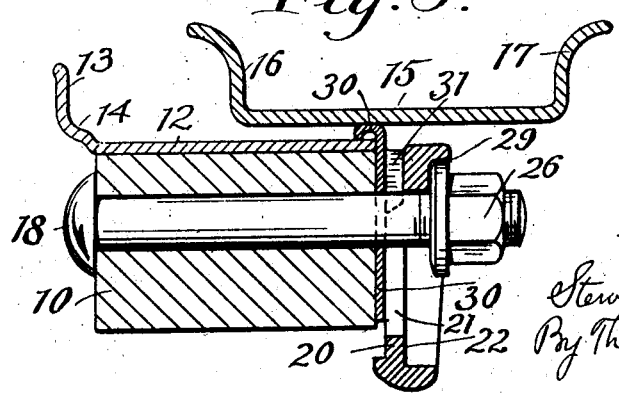
Inventor:
Stewart R. McKay
By Thurston & Kwis
attys

UNITED STATES PATENT OFFICE.

STEWART R. McKAY, OF CLEVELAND, OHIO, ASSIGNOR TO THE McKAY COMPANY, OF CLEVELAND, OHIO, A CORPORATION OF OHIO.

RIM-CLAMPING DEVICE.

1,228,796.       Specification of Letters Patent.       Patented June 5, 1917.

Application filed July 28, 1916.   Serial No. 111,938.

*To all whom it may concern:*

Be it known that I, STEWART R. McKAY, a citizen of the United States, residing at Colonial Heights, Cleveland, in the county of Cuyahoga and State of Ohio, have invented a certain new and useful Improvement in Rim-Clamping Devices, of which the following is a full, clear, and exact description.

This invention relates to so-called demountable rims for automobile wheels, the object being to provide simple, inexpensive and easily operated means by which to properly secure a demountable rim on a wheel, and to facilitate its quick and easy removal and replacement; and this without having to separate from the wheel any of the means by which these results are attained. The invention is shown in the accompanying drawings hereinafter described and definitely pointed out in the appended claims.

In the drawings, Figure 1 is a vertical sectional view through the upper part of the felly of a wheel and of the demountable rim thereon, and of one of the rim clamping devices by which said rim is fastened upon said felly. Fig. 2 is a perspective view of the rim clamp shown in Fig. 1; Fig. 3 is a similar section to that shown in Fig. 1 except that it shows the rim clamp in an inoperative position such as will permit the easy removal of the rim, and Fig. 4 is a perspective view of the plate 30.

Referring to the parts by reference characters, 10 represents the wheel felly; 12 the felly band, which preferably has on its inner edge an outwardly projecting flange 13 adapted to engage the rim 15 and thereby serve as the back rim clamping member, or means to limit the backward movement of the rim on the wheel. The term "backward" as above used is intended to signify toward the vehicle body.

This flange 13 is preferably formed with a slightly conical surface 14 with which the rim may engage, and by which it will be centered. A clamping bolt 18 is carried by the rim and projects from the front face thereof.

The parts above described are old; but well adapted to use with the front rim clamping devices in which is found the main features of novelty of the present invention. These old parts may be varied in form to any extent desired.

The rim 15 as shown is of familiar form and is known as a flat sided rim. The channel between the two side flanges 16 and 17 of this rim is shaped to fit a tire particularly designed therefor; but this channel may be shaped to fit any desired tire; and the shape of the rim may be otherwise varied as desired.

The clamp 20 has a radially extended slot 21 whose width is such that the bolt 18 can pass through it freely. The length and location of this slot is of importance, and will be presently described in detail.

On the front face of this clamp is a surface 22 for engagement by the nut 26, which screws onto the projecting end of the bolt. In the best form this surface is a depressed surface as shown in the drawings. The depression as shown is of cylindrical form, and of such diameter that the outwardly projecting flange 27 on the nut fits loosely and may freely turn therein; and such that the upper circular wall or flange 23 of this depression may rest upon the flange 27 of the nut when the clamp has been moved out to operative position shown in Fig. 1; and through the engagement of this circular wall with the flange of the nut, the clamp is held out in the operative position, and the nut takes whatever radial thrust may be imposed upon the clamp when the wheel is in use.

When the clamp has been moved out to the operative position shown in Fig. 1, its shoulder or flange 23 will rest upon the flange of the nut; as the nut is screwed on this flange will hold the clamp out in operative position as the nut pushes the clamp into clamping engagement with the rim.

When the nut 26 of the clamp at the top of the wheel is unscrewed its flange 27 will be withdrawn from beneath the shoulder 23, and thereupon the clamp will drop radially inward. The slot 21 must extend outward, that is, toward the outer end or jaw part of the clamp a distance such that this inward movement of the clamp will withdraw the jaw part 24 of said clamp wholly out of the path of the rim 15. In other words, the distance between the outer end of the slot 21 and the outer edge of the jaw must be less than the distance between the inner periphery of the rim and the adjacent surface of the bolt.

When the clamp has moved to the inoperative position, as shown in Fig. 3, the nut should be screwed on against the front face 25 of the clamp above the annular shoulder 23, and this will bind said clamp against the felly and prevent the clamp from falling by gravity to the operative position if the wheel be turned around.

It will be understood that on each wheel there will be as many of these clamping devices as may be required to firmly hold the rim upon the wheel. Preparatory to changing rims each of the clamps will be moved to the inoperative position, and clamped therein by the associated nut, the wheel in the meantime being preferably turned to progressively bring each clamp to the top of the wheel so that the clamp may move in the manner above described.

When all of the clamps have been moved and secured in this inoperative position, the rim may be readily removed, and a new rim placed upon the wheel. Then the clamps one by one must be moved to the operative position and clamped against this rim. A good practical way of effecting this result is to turn the wheel to bring the clamps one by one to the bottom of the wheel. The clamp at the bottom of the wheel, for example, may be released from the binding action of the nut by turning the nut off a little; whereupon the clamp will fall by gravity to the operative position. When in this position, the nut may be screwed on, and it will, by its engagement with the clamp, cause the clamp to be clamped tightly against the side of the rim.

It will be noted that above the depressed surface 22 there is another surface 25 which is also depressed but not so deeply. The upper wall 29 of this depression is cylindrical and may be so placed as to engage the flange of the nut when the clamp is in the inoperative position. This engagement prevents the upper end of the slot in the clamp from engaging the threaded surface of the bolts, and for that reason is of some slight service: but if the upper end of the slot did strike the threaded part of the bolt, and it would if this flange were omitted, or was not placed so that it would strike the flange of the nut, little if any harm would be done. This upper depression 28 and shoulder 29 are therefore of some slight value, but are not essential characteristics of the clamp.

It is quite customary in this art to affix a thin metal plate to the outer face of the felly behind each clamp, for the clamp to engage with instead of with the wood felly. 30 represents a metal plate secured in the position stated. But in the form shown it has two additional functions. Along both sides or edges of this plate are the outwardly bent flanges 31; which lie fairly close to the sides of the clamp 20, and thereby prevent the clamp from turning on the bolt, and therefore insures its radial movement from the operative to the inoperative position, and vice versa. Also the outer edge of this plate extends beyond the felly band and is bent over it and between it and the rim; and the inner periphery of the rim may engage it, and be thereby prevented from moving toward the axis of the wheel.

Having described my invention, I claim:

1. The combination of a wheel, a demountable rim thereon, and means to limit the backward movement of the rim upon the wheel, of a plurality of rim clamping devices each comprising a bolt which projects forward from the front side of the wheel felly, a nut on said bolt having an annular flange, and a clamp which lies between the nut and the wheel felly, and has a radial slot through which the bolt passes,— which slot is proportioned and located to permit the clamp to move radially from the operative position in which it may engage the rim, to the inoperative position in which it is wholly out of the path of the rim as the latter is moved onto or off of the wheel, and said clamp having also a cylindrical surface which overlies the flange on the nut and engages therewith when the clamp is in the operative position.

2. The combination of a wheel, a demountable rim thereon, and means to limit the backward movement of the rim upon the wheel, of a plurality of rim clamping devices each comprising a bolt which projects forward from the front side of the wheel felly, a nut on said bolt having an annular flange, and a clamp which lies between the nut and the wheel felly, and has a radial slot through which the bolt passes,— which slot is proportioned and located to permit the clamp to move radially from the operative position in which it may engage the rim, to the inoperative position in which it is wholly out of the path of the rim as the latter is moved onto or off of the wheel, and said clamp having also a cylindrical surface which overlies the flange on the nut and engages therewith when the clamp is in the operative position, a plate fixed to the front face of the felly behind the clamp, which plate has forwardly projecting side flanges which lie alongside of the sides of the clamp.

3. The combination of a wheel, a demountable rim thereon, and means to limit the backward movement of the rim upon the wheel, of a plurality of rim clamping devices each comprising a bolt which projects forward from the front side of the wheel felly, a nut on said bolt having an annular flange, and a clamp which lies between the nut and the wheel felly, and has a radial slot through which the bolt passes,—which slot is proportioned and located to permit the clamp to move radially from the operative position in which it may engage the rim, to the inoperative position in which it is wholly out of the path of the rim as the latter is moved onto or off of the wheel, and said clamp having also a cylindrical surface which overlies the flange on the nut and engages therewith when the clamp is in the operative position, a plate fixed to the front face of the felly behind the clamp, having its outer end bent over the felly band and between it and the rim, and in substantial contact with the latter.

4. The combination of a wheel, a demountable rim thereon, and means to limit the inward movement of the rim upon the wheel, of a plurality of rim clamping devices,— each comprising a bolt which projects forward from the front side of the wheel felly, a nut on said bolt having adjacent its back end an outwardly extended annular flange, and a clamp which lies between the nut and wheel felly and has a radial slot through which said bolt passes,—which slot extends radially toward the outer end of the clamp to a point such that the distance between the outer end of the slot and the outer edge of the clamp is less than the distance between the bolt and the inner periphery of the rim, and said clamp having a depressed surface for the rear end of the nut to engage with when the clamp is in operative position and having above said depressed surface an outwardly projecting cylindrical flange which overlies and engages the flange of said nut.

5. A rim clamp having a jaw portion and a shank portion which shank portion is formed with a cylindrical depression in its front face, and has a radial slot which extends from about the center of said depression outward toward the jaw and to a point which lies between said depression and the outer edge of said jaw.

In testimony whereof, I hereunto affix my signature in the presence of two witnesses.

STEWART R. McKAY.